United States Patent Office 3,566,673
Patented Mar. 2, 1971

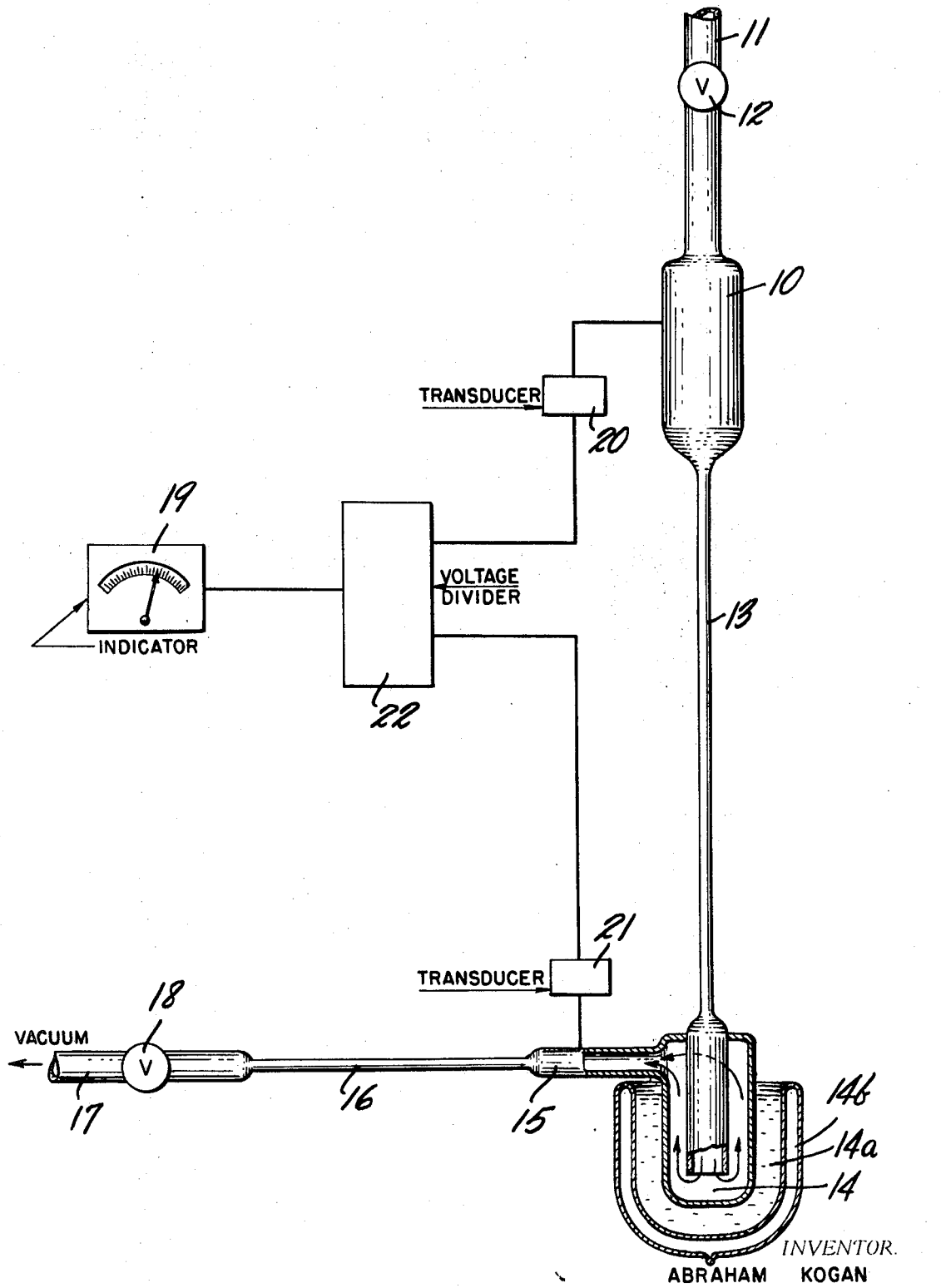

3,566,673
METHOD AND APPARATUS FOR MEASUREMENT OF CONCENTRATION OF A GAS IN A GAS MIXTURE
Abraham Kogan, 35a Trumpelder Ave.,
Neve Shaanan, Haifa, Israel
Filed Feb. 28, 1968, Ser. No. 709,119
Int. Cl. G01n *31/06*
U.S. Cl. 73—23          13 Claims

ABSTRACT OF THE DISCLOSURE

A method and apparatus for determining the concentration of a gas component in a gas mixture which includes discharging the gas mixture from a first chamber through a restricted passage under choked flow conditions, separating the gas which is to be measured as to its concentration in the mixture, introducing the separated gas into a second chamber and discharging it from the second chamber through a restricted passage under choked flow conditions, and measuring the ratio of the pressure of the second chamber to the pressure of the first chamber.

---

This invention relates to a method and apparatus for measuring the concentration of a gas component in a mixture of gases in which the gas component can be separated from the mixture by some physical or chemical means.

The invention utilizes the principle that the molar flow rate of a gas discharged from a chamber through a restricted passage under choked flow conditions will be proportional to the pressure in the chamber and independent of the downstream pressure.

In the present invention the mixture of gases is introduced into a first chamber and discharged therefrom through a restricted passage under choked flow conditions, so that the molar flow rate of the gas mixture is proportional to the pressure in the first chamber. The gas component whose concentration is to be determined is then isolated from the other gas component in the mixture, such as by freezing the other gas component or by use of an adsorbent material. The isolated gas component is then introduced into a second chamber and discharged therefrom through a restricted passage under choked flow conditions, so that the molar flow rate of the separated gas will be proportional to the pressure in the second chamber. The concentration of the separated gas in the gas mixture can then be determined from the ratio of the pressure in the second chamber to the pressure in the first chamber.

The invention has general application to the measurement of the concentration of one gas in a mixture of gases, but an application in which the present invention is particularly useful is in the measurement of non-condensable gases in the water vapor evolved from a liquid to be distilled in a distillation system. The determination of the concentration of noncondensable gases in the water vapor of a distillation system has heretofore been a difficult and challenging task. The present invention provides a method and apparatus which greatly simplifies and facilitates this and other measurements.

For a more complete understanding of the present invention reference can be made to the detailed description which follows and to the accompanying drawing in which the apparatus is schematically illustrated.

The method and apparatus for measuring the concentration of a gas in a gas mixture is described herein in a particular application, namely, the determination of the concentration of small amounts of noncondensable gas in water vapor evolved from a liquid to be distilled.

The apparatus shown in the drawing includes a first stagnation chamber 10 for receiving the gas mixture, a conduit 11 communicating with the vapor region of a distillation system for introducing the gas mixture into the chamber 10, a valve 12 in the conduit 11, a long capillary tube 13 through which the gas mixture is discharged from the chamber 10 under choked flow conditions, a chamber 14 for receiving the gas mixture from the capillary tube and in which the gas which is to be measured as to its concentration in the mixture is separated, a second stagnation chamber 15 for receiving the separated gas, a long capillary tube 16 for discharging the separated gas from the chamber 15 under choked flow conditions, a conduit 17 connecting the capillary tube 16 with a vacuum pump or other vacuum source, and a valve 18 in the conduit 17.

The capillary tubes 13 and 16 provide restricted passages and are of a cross-sectional area small enough to assure choked flow through them under normal operating conditions. Although the restricted passages are illustrated in the form of long glass capillary tubes, orifices or nozzles can also be used to provide the necessary restricted passages.

To measure the proportion of noncondensable gases in the gas mixture, the valves 12 and 18 are opened, introducing a flow of the gas mixture into the chamber 10 from which it is discharged under choked flow conditions through the restricted tube 13. The molar flow rate under these conditions is proportional to the pressure in the chamber 10 and independent of the pressure in the separator 14.

The noncondensable gases are separated from the condensable gases in the separating chamber 14. This can be accomplished in various ways, depending on the characteristics of the gases. In the particular application illustrated in the drawing the gas mixture is brought into out-of-contact heat exchange relationship with liquid air or other cooling medium 14a in a Dewar flask 14b, freezing the water vapor component within the separator chamber while permitting the noncondensable gas component to flow into the second stagnation chamber 15. In the alternative, an adsorbent material can be used to separate out the water vapor component.

The noncondensable gases are discharged from the chamber 15 through the restricted passage 16 under choked flow conditions, so that the molar flow rate of the noncondensable gases is proportional to the pressure in the chamber 15. The noncondensable gases are then discharged through the conduit 17.

The separator chamber 14 can also perform the function of the second stagnation chamber 15, provided that it is of large enough cross section as compared with the cross sectional area of the restricted passages. In this case the chamber 15 may be omitted and the restricted passage may be connected directly to the separator chamber 14.

The molar flow rate $N$ of the gas mixture through the restricted passage 13 is proportional to the pressure $P_1$ in the chamber 10 and is equal to the sum of the molar flow rates of the component gases, or that is to say:

$$N = N_\text{g} + N_\text{v} = C_1 P_1$$

where $N_\text{g}$ and $N_\text{v}$ are the molar flow rates of the noncondensable gases and water vapor, respectively, and $C_1$ is a constant determined by the geometry of the restricted passage 13 and by temperature and composition of the gas mixture at the entrance to the restricted passage 13.

The molar flow rate $N_\text{g}$ of the noncondensable gas is proportional to the pressure $P_2$ in the chamber 15, or:

$$N_\text{g} = C_2 P_2$$

where $C_2$ is a constant determined by the geometry of the restricted passage 16 and by the temperature and composition of the noncondensable gases at the entrance to the restricted passage 16.

The mole fraction of noncondensable gas $C_g$ in the mixture can be expressed:

$$C_g = \frac{N_g}{N_g + N_v} = \frac{N_g}{N} = C\frac{P_2}{P_1}$$

where $C = C_2/C_1$ is a constant determined by the geometry of the restrictions of the restricted passages 13 and 16 and by the temperatures and other properties of the flowing gases.

The proportion of noncondensable gases in the gas mixture can be read at a glance on a meter 19, if desired, by converting the pressures into electrical outputs using electrical transducers 20 and 21 and feeding the respective outputs into a conventional voltage divider 22. The voltage output of the voltage divider is proportional to the mole fraction of the noncondensable gas component in the gas mixture. The constant of proportionality is taken into account by the calibration of the voltage divider.

The voltage divider can be a conventional circuit of the type used in analog computers. See Electronic Analog and Hybrid Computers by Granino A. and Theresa M. Korn, published by McGraw-Hill, Inc., 1964, page 1–14.

If the separation of the noncondensable gases is accomplished by freezing the condensable gases in the vapor separator 14 functioning as a liquid air cold trap, the temperature of the noncondensable gas flow entering the second restricted passage 16 is substantially constant. Variation of the temperature of the mixture entering the first restricted passage 13 will then affect slightly the calibration curve of the instrument.

In an alternative design using an adsorbent material as the separator, the ratio $T_2/T_1$ of the temperatures of flows entering the restricted passages 16 and 13, respectively, will be less sensitive to variations in the inlet gas temperature $T_1$ and the calibration line of $C_g$ vs. $P_2/P_1$ will be very little affected by the temperature of the inlet gas.

The invention has been described in preferred form and by way of example only, and obviously, many variations and modifications may be made therein without departing from the spirit of the invention. The invention, therefore, is not to be limited to any specified form or embodiment, except insofar as such limitations are set forth in the claims.

I claim:

1. A method for determining the concentration of a gas component in a gas mixture comprising the steps of discharging the gas mixture from a first chamber through a restricted passage under choked flow conditions, separating the gas which is to be measured as to its concentration in the mixture, introducing the separated gas which is to be measured as to its concentration in the mixture into a second chamber, discharging the said separated gas from the second chamber through a restricted passage under choked flow conditions, and measuring the ratio of the pressure of the second chamber to the pressure of the first chamber.

2. A method as set forth in claim 1 in which the separating step is accomplished by changing the state of at least one of the gas components from the gaseous state.

3. A method as set forth in claim 1 in which the gas mixture contains condensable and noncondensable components and in which the separation of the noncondensable component is accomplished by freezing the condensable gas component before introducing the noncondensable component into said second chamber.

4. A method as set forth in claim 1 in which the gas mixture contains condensable and noncondensable components and in which the separation of the noncondensable gas component is accomplished by passing both components into contact with an adsorbent material which passes one of said components and not the other.

5. A method as set forth in claim 1 in which the ratio of pressure is measured by converting the respective pressures into separate electrical outputs and then dividing the electrical outputs using a voltage divider into a single electrical output which is proportional to the ratio of the pressure of the second chamber to the pressure of the first chamber.

6. A method as set forth in claim 1 in which the gas component is separated from the gas mixture within said second chamber.

7. An apparatus for determining the concentration of a gas component in a gas mixture comprising a first chamber into which the gas mixture is introduced, a restricted flow passage communicating at one end with the first chamber and having a cross-sectional area small enough to provide a choked flow discharge of the gas mixture from said first chamber, a gas separator communicating with the other end of said restricted flow passage for separating out the gas component which is to be measured as to its concentration in the mixture, a second chamber into which the said separated gas component is introduced, a restricted flow passage communicating with the second chamber and having a cross-sectional area small enough to provide a choked flow discharge of the separated gas component from the second chamber, and means for sensing the pressures in said first and second chambers to enable the ratios thereof to be determined.

8. An apparatus as set forth in claim 7 in which the gas separator includes means for changing the state of at least one of the gas components from the gaseous state.

9. An apparatus as set forth in claim 7 in which the gas mixture contains condensable and noncondensable components and the gas separator includes means for freezing the condensable gas component.

10. An apparatus as set forth in claim 7 in which the gas mixture contains condensable and noncondensable components and the gas separator is an adsorbent material which passes only the noncondensable component.

11. An apparatus as set forth in claim 7 in which the gas separator includes the said second chamber, the gas component being separated from the gas mixture in said second chamber.

12. An apparatus as set forth in claim 7 including vacuum means in communication with the restricted passage through which the separated gas component is discharged from the said second chamber.

13. An apparatus as set forth in claim 7 in which said sensing means includes transducer means for converting the pressures in the first and second chambers into separate electrical outputs and a voltage divider for dividing the electrical outputs into a single electrical output which is proportional to the ratio of the pressure of the second chamber to the pressure of the first chamber.

References Cited

UNITED STATES PATENTS

| | | | |
|---|---|---|---|
| 522,746 | 7/1894 | Uehling et al. | 23—232 |
| 1,634,331 | 7/1927 | Mase | 23—232 |
| 2,263,335 | 11/1941 | Heinz | 73—23 |
| 2,287,101 | 7/1942 | Horvitz | 23—232 |
| 2,870,628 | 1/1959 | Donaldson | 73—23 |
| 3,234,780 | 2/1966 | Pappas | 73—29 |

RICHARD C. QUEISSER, Primary Examiner

C. E. SNEE III, Assistant Examiner

U.S. Cl. X.R.

23—232, 255